United States Patent
Nakagawa et al.

(10) Patent No.: US 9,321,923 B2
(45) Date of Patent: Apr. 26, 2016

(54) AQUEOUS INK FOR INKJET, INK CARTRIDGE, AND INKJET RECORDING DEVICE

(71) Applicants: Tomohiro Nakagawa, Kanagawa (JP); Naohiro Toda, Kanagawa (JP); Hidefumi Nagashima, Kanagawa (JP); Juichi Furukawa, Kanagawa (JP); Ichiroh Fujii, Kanagawa (JP)

(72) Inventors: Tomohiro Nakagawa, Kanagawa (JP); Naohiro Toda, Kanagawa (JP); Hidefumi Nagashima, Kanagawa (JP); Juichi Furukawa, Kanagawa (JP); Ichiroh Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/472,458

(22) Filed: Aug. 29, 2014

(65) Prior Publication Data

US 2015/0077479 A1 Mar. 19, 2015

(30) Foreign Application Priority Data

Sep. 13, 2013 (JP) ................. 2013-190895

(51) Int. Cl.
*B41J 2/01* (2006.01)
*C09D 11/033* (2014.01)
(Continued)

(52) U.S. Cl.
CPC ............. *C09D 11/033* (2013.01); *B41J 2/2107* (2013.01); *C09D 11/322* (2013.01); *C09D 11/38* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ........... 347/95, 96, 100, 101, 102, 88, 99, 21, 347/20; 106/31.6, 31.27, 31.13; 523/160, 523/161
See application file for complete search history.

(56) References Cited

U.S. PATENT DOCUMENTS

2010/0302326 A1 12/2010 Morohoshi et al.
2012/0176455 A1* 7/2012 Ohta et al. .................... 347/102
(Continued)

FOREIGN PATENT DOCUMENTS

JP 2005-220352 8/2005
JP 2009-067909 4/2009
(Continued)

OTHER PUBLICATIONS

U.S. Appl. No. 14/482,134, filed Sep. 10, 2014, Naohiro Toda, et al.
(Continued)

*Primary Examiner* — Manish S Shah
(74) *Attorney, Agent, or Firm* — Cooper & Dunham LLP (57) ABSTRACT

Aqueous ink for inkjet that contains water; a hydrosoluble organic solvent; a pigment; and a resin, wherein the hydrosoluble organic solvent comprises 2,3-butane diol having a total ratio of (2R, 3R) form and (2S, 3S) form of greater than 50% by weight in 2,3-butane diol, where (2R, 3R) form represents (2R, 3R)-(−)-2,3-butane diol and (2S, 3S) form represents (2S, 3S)-(+)-2,3-butane diol, wherein 2,3-butane diol accounts for 5% by weight to 40% by weight of the entire aqueous ink.

6 Claims, 2 Drawing Sheets

(51) Int. Cl.
*B41J 2/21* (2006.01)
*C09D 11/322* (2014.01)
*C09D 11/38* (2014.01)

(56) References Cited

U.S. PATENT DOCUMENTS

| | | |
|---|---|---|
| 2012/0293582 A1 | 11/2012 | Goto et al. |
| 2012/0308785 A1 | 12/2012 | Nakagawa |
| 2012/0320133 A1 | 12/2012 | Namba et al. |
| 2012/0328853 A1 | 12/2012 | Matsuyama et al. |
| 2013/0002776 A1 | 1/2013 | Nagashima et al. |
| 2013/0023614 A1 | 1/2013 | Hatada et al. |
| 2013/0113860 A1 | 5/2013 | Gotou et al. |
| 2013/0194345 A1 | 8/2013 | Tamai et al. |
| 2013/0197144 A1 | 8/2013 | Katoh et al. |
| 2013/0271524 A1 | 10/2013 | Katoh et al. |
| 2014/0002539 A1 | 1/2014 | Goto et al. |
| 2014/0192121 A1 | 7/2014 | Bannai et al. |

FOREIGN PATENT DOCUMENTS

| | | |
|---|---|---|
| JP | 2009-138118 | 6/2009 |
| JP | 2011-094082 | 5/2011 |
| JP | 2011-190406 | 9/2011 |

OTHER PUBLICATIONS

U.S. Appl. No. 14/297,868, filed Jun. 6, 2014.

\* cited by examiner

AQUEOUS INK FOR INKJET, INK CARTRIDGE, AND INKJET RECORDING DEVICE

CROSS-REFERENCE TO RELATED APPLICATION

This patent application is based on and claims priority pursuant to 35 U.S.C. §119 to Japanese Patent Application No. 2013-190895 on Sep. 13, 2013 in the Japan Patent Office, the entire disclosure of which is hereby incorporated by reference herein.

BACKGROUND

1. Technical Field

The present invention relates to an aqueous ink for inkjet, and an ink cartridge, and an inkjet recording device.

2. Background Art

As ink for inkjet recording, solvent-based inkjet ink containing a resin dissolved in an organic solvent which is used as a vehicle and ultraviolet-curable inkjet ink using a polymerizable monomer as its main component have been widely used.

In addition, development of inkjet technology is in progress to use aqueous ink widely used at home so far, which is less burden on environment, for industrial use.

SUMMARY

The present invention provides an improved aqueous ink for inkjet that contains water; a hydrosoluble organic solvent; a pigment; and a resin, wherein the hydrosoluble organic solvent comprises 2,3-butane diol having a total ratio of (2R, 3R) form and (2S, 3S) form of greater than 50% by weight in 2,3-butane diol, where (2R, 3R) form represents (2R,3R)-(−)-2,3-butane diol and (2S, 3S) form represents (2S,3S)-(+)-2,3-butane diol and 2,3-butane diol accounts for 5% by weight to 40% by weight of the entire of the aqueous ink.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

The present invention is to provide an aqueous ink for inkjet that has excellent storage property and discharging stability over time and satisfies drying properties and image robustness at printed portions even when an image is printed on a non-porous substrate, into which aqueous ink is not or little permeable.

2,3-butane diol has a low boiling point and possibly improves the drying properties of ink on a substrate. It has stereoisomers referred to as diastereomers, which are the following three kinds of compounds having different structures.

(2R,3R)-(−)-2,3-butane diol is hereinafter referred to as (2R, 3R) form (2S,3S)-(+)-2,3-butane diol is hereinafter referred to as (2S, 3S) form, and meso-2,3-butane diol is hereinafter referred to as meso form.

(2R,3R)-(−)-2,3-butane diol

Chemical formula 1

(2S,3S)-(+)-2,3-butane diol

Chemical formula 2

Meso Butane Diol

Chemical formula 3

The present inventors studied blending of 2,3-butane diol in aqueous ink while considering the presence of the stereoisomers mentioned above.

As a result, the present inventors have found that excellent discharging stability and the drying properties of printed matters are compatible when using a hydrosoluble organic solvent containing 2,3-butane diol having a total ratio of (2R, 3R) form and (2S, 3S) form of greater than 50% by weight.

This is inferred that, in comparison with compounds having boiling points (or vapor pressure) around those of (2R, 3R) form and (2S, 3S) form, these forms are easily molecule interactive with water, thereby reducing the evaporation speed of water in ink and slowing down the viscosity increasing speed of ink at nozzle portions. In addition, since the boiling point is low, these compounds evaporate quickly. As a result, the drying property of printed matters are not degraded.

Furthermore, as a result of the investigation, the present inventors have found that (2R, 3R) form and (2S, 3S) form have stronger function as layer-forming helping agent to a resin than the meso form. For this reason, in spite of high drying properties after printing, a uniform layer of a resin is properly formed and resultant printed matters have sufficient image robustness.

The present invention was thus made.

An embodiment of the present invention is:

1. Aqueous ink for inkjet that contains water, a hydrosoluble organic solvent; a pigment; and a resin, wherein the hydrosoluble organic solvent comprises 2,3-butane diol having a total ratio of (2R, 3R) form and (2S, 3S) form of greater than 50% by weight in 2,3-butane diol, where (2R, 3R) form represents (2R,3R)-(−)-2,3-butane diol and (2S, 3S) form represents (2S,3S)-(+)-2,3-butane diol, wherein 2,3-butane diol accounts for 5% by weight to 40% by weight of the entire of the aqueous ink.

The present disclosure of the embodiment 1 mentioned above will be described below in detail. The embodiment described above of the present disclosure includes the following 2 to 6. These are also described.

2. The aqueous ink for inkjet according to 1 mentioned above, wherein the hydrosoluble organic solvent further contains at least one of 1,3-propane diol, 1,2-butane diol, and 1,3-butane diol.

3. The aqueous ink for inkjet according to 1 or 2 mentioned above, wherein the resin has a volume average particle diameter of from 20 nm to 50 nm.

4. An ink cartridge having an ink container to accommodate the aqueous ink for inkjet of 1 to 3 mentioned above.

5. An inkjet recording device containing the ink cartridge of 4 mentioned above; an ink discharging device to apply a stimulus to ink to discharge the ink for printing; a transfer device to transfer a recording medium; and a heater to fix droplets of ink on the recording medium.

6. An inkjet recording device according to 5 mentioned above, wherein the heating temperature of the heater is set to be from 40° C. to 80° C.

Hydrosoluble Organic Solvent

The ink of the present disclosure contains 2,3-butane diol having a total ratio of (2R, $3_R$) form and (2S, 3S) form greater than 50% as the hydrosoluble organic solvent. 2,3-butane diol accounts for 5% by weight to 40% by weight in the entire ink and preferably 10% by weight to 30% by weight.

As a result of the investigation made by the present inventors, they found there was nothing different between (2R, 3R) form and (2S, 3S) form as hydrosoluble organic solvent for use in ink. Therefore, the thing is that the total amount of either or both of (2R, 3R) form and (2S, 3S) form contained in ink is 50% by weight or more. In other words, the ratio of meso form has to be less than 50% by weight.

To obtain 2,3-butane diol as described above, the mixing ratio of (2R, 3R) form, (2S, 3S) form, and meso form thereof is adjusted. According to the gas chromatography mass analysis (GC/MS) method, it is possible to obtain the total ratio of (2R, 3R) form and (2S, 3S) form in a mixture.

Figure 1:
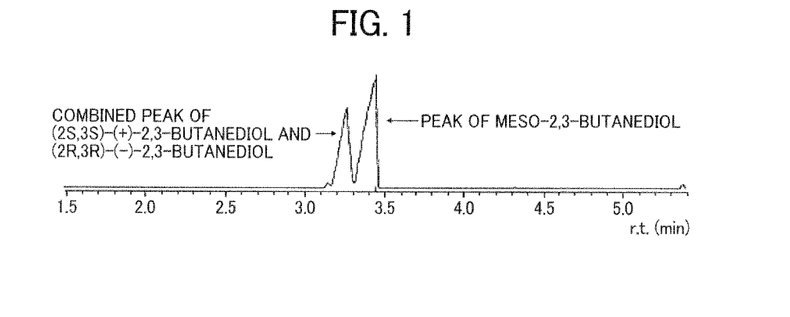
FIG. 1 is a graph illustrating the results of gas chromatography analysis of 2,3-butane diol in which the meso form accounts for 75% by weight and (2R, 3R) form and (2S, 3S) form account for 25% by weight.

As an example, under the analysis conditions under which (2R, 3R) form and (2S, 3S) form are separable from meso form, the analysis result of gas chromatography of 2,3-butane diol is shown by the graph of FIG. 1 in which the ratio of the meso form is 75% by weight and the total ratio of (2R, 3R) form and (2S, 3S) form is 25% by weight. The analysis tool and the analysis conditions are as follows:

GC-MS equipment: QP2010, manufactured by Shimadzu Corporation

Heater: Py 2020D, manufactured by Frontier Laboratories Ltd.

Heating temperature: 250° C.

Column: Ultra ALLOY-5, L=30 m, ID=0.25 mm, Film=0.25 μm

Column temperature rising: 50° C. (maintained for one minute) to 130° C. (temperature rising speed: 10° C./min.) to 350° C. (temperature rising speed: 20° C./min. and held for one minute)

Carrier Gas Pressure: 53.6 kPa constant

Column flowing amount: 1.0 mL/min.

Ionization method: EI method (70 eV)

Pouring mode: Split (1:100)

Mass range: m/z 29 to 700

In addition, it is preferable to add at least one of 1,3-propane diol, 1,2-butane diol, and 1,3-butane diol as hydrosoluble organic solvent to produce images with better gloss. The content of these diols in ink is preferably from 3 percent by weight to 35 percent by weight and more preferably from 5 percent by weight to 25 percent by weight.

Furthermore, another hydrosoluble organic solvent is optionally added.

Specific examples thereof include, but are not limited to, polyols such as ethylene glycol, propylene glycol, 2-methyl-2,4-pentane diol, diethylene glycol, triethylene glycol, dipropylene glycol, 1,4-butane diol, 2,2-dimethyl-1,3-propane diol, 2-methyl-1,3-propane diol, 1,2-pentane diol, 2,4-pentane diol, 1,5-pentane diol, 1,6-hexane diol, 2-ethyl-1,3-hexane diol, and 2,5-hexane diol; polyol alkyl ethers such as dipropylene glycol monomethyl ether, propylene glycol-n-butyl ether, propylene glycol-t-butyl ether, diethylene glycol methyl ether, ethylene glycol-n-propyl ether, ethylene glycol-n-butyl ether, dipropylene glycol-n-propyl ether, tripropylene glycol methyl ether, triropylene glycol-n-propyl ether, propylene glycol phenyl ether, triethylene glycol methyl ether, triethylene glycol methyl ether, triethylene glycol ethyl ether, diethylene glycol-n-hexyl ether, and ethylene glycol phenyl ether, esters such as ethyl lactate; nitrogen-containing heterocyclic ring compounds such as N-methyl-2-pyrolidone, N-hydroxyethyl-2-pyrolidone, 2-pyrolidone, 1,3-dimethyl imidazoline, and ε-caprolactam; amides such as form amide, N-methyl formamide, N,N-dimethyl formamide; amines such as monoethanol amine, diethanol amine, triethanol amine, monoethyl amine, diethyl amine, and triethyl amine; and sulfur-containing compounds such as dimethyl sulfoxide, sulfolane, thiodiethanol, and thiodiglycol.

These may be used alone or in combination of two or more thereof.

The total amount of the hydrosoluble organic solvent in ink is preferably from 20% by weight to 70% by weight and more preferably from 30% by weight to 60% by weight. When the total amount is 20% by weight or more, ink is not or little dried, thereby obtaining sufficient discharging stability. In addition, when the total amount is 70% by weight or less, the ink viscosity does not become excessively high, which is advantageous for discharging.

Resin

The aqueous ink of the present disclosure contains a resin. It is preferable to add a resin in a form of resin emulsion in which the resin is dispersed in water during ink manufacturing.

There is no specific limit to the kind of resin emulsion and a suitable resin emulsion can be selected to a particular application. Specific examples thereof include, but are not limited to, emulsions of urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. Of these, urethane resins and acrylic-based resins are preferable in terms of fixability and ink stability. In addition, such a resin emulsion optionally contains a dispersant such as a surfactant. However, to obtain ink having excellent layer forming property, so-called self-emulsification type resin emulsions are preferable. It is preferable to contain an anionic group having an acid value of from 5 mgKOH to 100 mgKOH/g and particularly preferable when the acid value ranges from 5 mgKOH to 50 mgKOH/g to impart excellent scratch-resistance and chemical resistance.

In addition, it is possible to obtain good hydrodispersion stability by using carboxylic group, sulfonic acid group, etc. as anionic group. To introduce an anionic group into a resin, it is suitable to use a monomer having such an anionic group.

As the resin emulsion, suitable emulsions can be synthesized or are available on market.

Specific examples of the products on market include, but are not limited to, Microgel E-1002 and E-5002 (styrene-acrylic-based resin emulsions, manufactured by Nippon Paint Co., Ltd.), Voncoat 4001 (acrylic-based resin emulsion, manufactured by Dainippon Ink and Chemicals, Inc.), Voncoat 5454 (styrene-acrylic-based resin emulsion, manufactured by Dainippon Ink and Chemicals, Inc.), SAE-1014 (styrene-acrylic-based resin emulsion, manufactured by Nippon Zeon Co., Ltd.), and Saivinol SK-200 (acrylic-based resin emulsion, manufactured by Saiden Chemical Industry Co., Ltd.), Primal AC-22 and AC-61 (acrylic-based resin emulsions, manufactured by The Dow Chemical Company), NANOCRYL SBCX-2821 and 3689 (acrylic-silicone-based resin emulsions, manufactured by Toyo Ink Co., Ltd.), and #3070 (methyl methacrylate polymer resin emulsion, manufactured by MIKUNI COLOR LTD.).

In addition, with regard to the particle diameter of a resin, considering using it in an inkjet recording device in particular, the volume average particle diameter is preferably from 10 nm to 1,000 nm and more preferably from 20 nm to 50 nm. Using a resin having a volume average particle diameter of from 20 nm to 50 nm, the contact area of the surface of a dispersed resin and 2,3-butane diol having a content ratio of (2R, 3R) form and/or (2S, 3S) form of from 50% by weight or more is increased, thereby boosting the layer forming property of the resin. As a result, a continuous robust resin layer is formed so that a printed matter having a high strength is obtained.

The volume average particle diameter can be measured by using a particle size analyzer (Microtrac MODEL UPA 9340, manufactured by Nikkiso Co., Ltd.).

The content of the resin in ink is preferably from 1% by weight to 10% by weight in terms of fixing property and ink stability and more preferably from 5% by weight to 10% by weight in terms of smoothness of ink layer, gloss, and fixability of a substrate.

In addition, if the content of the resin in ink is not less than the content of a pigment, preferably double or more, it is possible to obtain better gloss and high scratch resistance.

Pigment

Inorganic pigments and organic pigments can be used as pigment. Pigments having affinity with a hydrosoluble organic solvent are preferable.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Preferred specific examples of the black pigments include, but are not limited to, carbon black (C.I. Pigment Black 7) such as furnace black, lamp black, acetylene black, and channel black, metals such as copper, iron (C.I. Pigment Black 11), and titanium oxides, and organic pigments such as aniline black (C.I. Pigment Black 1).

Preferred specific examples of the pigments for color include, but are not limited to, C.I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 150, and 153; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B (Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

The surface area of a pigment is preferably from about 10 $m^2/g$ to about 1,500 $m^2/g$, more preferably from about 20 $m^2/g$ to about 600 $m^2/g$, and furthermore preferably about 50 $m^2/g$ to about 300 $m^2/g$. Unless a pigment has such a desired surface area, it is suitable to reduce the size of the pigment or pulverize it by using, for example, a ball mill, a jet mill, or ultrasonic wave.

Pigments can be dispersed in ink by a known dispersion method such as a dispersion method using a surfactant or a dispersible resin, a dispersion method of coating the surface of pigments with a resin, and a dispersion method of forming self-dispersible pigments by introducing hydrophilic group into the surface of pigments.

The volume average particle diameter ($D_{50}$) of pigments in ink is preferably from 10 nm to 200 nm and more preferably from 20 nm to 150 nm. When the particle diameter surpasses 200 nm, the dispersion stability of pigments in ink tends to be worsened and in addition, the discharging stability of the ink tends to deteriorate, thereby degrading image quality such as image density. By contrast, when the volume average particle diameter is reduced to less than 10 nm, dispersion operation and classification operation become complicated, thereby making it difficult to manufacture ink economically.

The addition amount of the pigment in ink is preferably from about 0.1% by weight to about 10% by weight and more preferably from about 1% by weight to about 10% by weight.

Generally, as pigment concentration increases, image density increases so that image quality is improved. However, reliability on fixability, discharging stability, and clogging tends to deteriorate.

Surface Active Agent (Surfactant)

As for the ink of the present disclosure, it is preferable to add a surfactant so as to secure the wettability thereof to a recording medium. The addition amount of a surfactant to the entire of ink is preferably from 0.1% by weight to 5% by weight therein.

When the addition amount is less than 0.1% by weight, the wettability of ink to a non-porous substrate tends to be insufficient, thereby degrading image quality. When the addition amount is greater than 5% by weight, ink tends to foam, leading to occurrence of non-discharging.

An amphoteric surfactant, a nonionic surfactant, and an anionic surfactant are usable as surfactant. Considering the relation between the dispersability of a pigment and image quality, nonionic surfactants are preferable, such as polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic acid esters, polyoxyethylene sorbitan aliphatic acid esters, and adducts of acetylene alcohol with ethylene oxides. In addition, it is possible to add a fluorine-containing surfactant or silicone-based surfactant depending on prescription.

Other Additives

Examples of other additives added to ink include, preservatives and fungicides, corrosion inhibitors, and pH regulators.

Specific examples of preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

There is no specific limit to the selection of pH regulators and any material that can adjust pH to a particular value without an adverse impact on prescribed ink can be used as pH regulator.

Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink of the present disclosure can be manufactured by adding water to the components mentioned above optionally followed by stirring and mixing.

Mixing and stirring can be conducted by a typical stirrer using a stirring wing, a magnetic stirrer, a high performance disperser, etc. However, there is no specific method required but any known method is applicable.

Inkjet Recording Device

The inkjet recording device of the present disclosure has at least an ink cartridge having a container to accommodate the ink of the present disclosure, an ink discharging device to apply a stimulus to ink to discharge the ink for printing, a transfer device, and a heater to fix droplets of the ink on a recording medium (substrate).

The ink discharging device discharges ink to form an image by applying an stimulus to the ink of the present disclosure.

There is no specific limit to the ink discharging device. Any ink discharging device is appropriately selected to a particular application. For example, various recording heads (ink discharging head) are usable. In particular, a discharging device is preferable which has a head having multiple nozzle lines and a sub-tank to accommodate ink supplied from an ink cartridge and supply the ink to the head. It is preferable that the sub-tank mentioned above has a negative pressure producing device to produce a negative pressure, an air releasing device to release air in the sub-tank, and a detector to detect whether there is ink therein by the difference of electric resistances.

The stimulus mentioned above is generated by, for example, a stimulus generating device. There is no specific limit to the selection of the kind of stimuli. Heat (temperature), pressure, vibration, and light can be suitably used.

These may be used alone or in combination of two or more thereof. Of these, heat and pressure are preferable.

Examples of the device to generate such a stimulus include a heater, a pressurization device, a piezoelectric element, a vibrator, an ultrasonic oscillator, light, etc.

Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

There is no specific limit to how the ink is discharged, which differs depending on the kind of the stimuli. For example, in a case in which "heat" is applied as a stimulus, a method can be used which includes imparting thermal energy according to recording signals to ink in a recording head by, for example, a thermal head to generate foams in the ink, thereby discharging and spraying the ink as droplets from the nozzles of the recording head due to the pressure of the foam.

In addition, in a case in which the stimulus is "pressure", for example, a method can be used in which ink is discharged and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

Of these, it is preferable to discharge ink by applying a voltage to a piezoelectric element. No heat is generated by the piezoelectric system, which is advantageous to discharge ink containing a resin.

This is particularly suitable to subdue clogging in nozzles when ink containing a small amount of wetting agent is used. In addition, to prevent non-discharging of ink caused by clogging of nozzles, it is preferable to conduct false scanning by applying to a piezoelectric element a voltage above which ink is discharged.

Furthermore, before false scanning reaching an amount corresponding to one page printing, it is preferable to operate discharging ink in an ink storing portion. In addition, it is preferable to include a scraper to scrape ink fixated on a receiver of false discharging. Using a wiper or a cutter is preferable as the scraper.

As the transfer device to transfer a recording medium (substrate), known transfer devices such as a transfer roller and a transfer belt are suitable.

In addition, as the heating device (heater) to fix droplets of ink on a substrate, one or more known heating devices can be selected to a particular application.

As the heating device, for example, devices for a forced-air heating, radiation heating, conductive heating, high frequency drying, or microwave drying are usable.

Such heating devices can be built or externally installed onto a conventional inkjet printer.

The heating temperature after printing is preferably from 40° C. to 80° C. in the present disclosure.

Within this range, images with good gloss and excellent fixing property can be printed.

Figure 2:
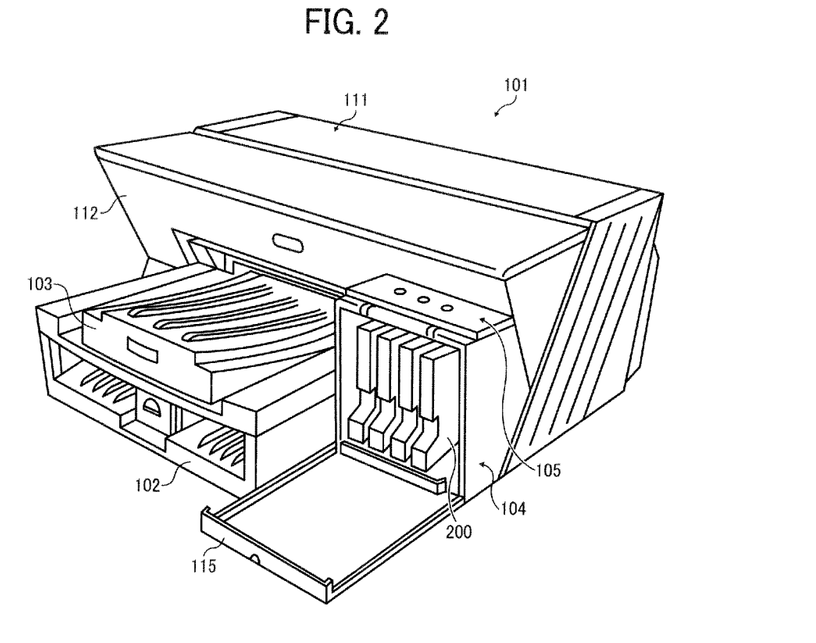
FIG. 2 is a schematic diagram illustrating an example of an inkjet recording device according to an embodiment of the present invention.

FIG. 2 is a schematic diagram illustrating an example of an inkjet recording device of the present disclosure.

A serial type (shuttle type) in which a carriage scans is described in the following, but is true in a line-type inkjet recording device having a line type head.

The device illustrated in FIG. 2 is an inkjet recording device 101 having a sheet feeder tray 102 placed therein to feed recording media (substrates), a discharging tray 103 installed onto inkjet recording device 101 to store the recording media on which images are recorded (formed), and an ink cartridge loading unit 104.

On the upper surface of the ink cartridge loading unit 104 is arranged an operating unit 105 such as operation keys and a display.

The ink cartridge loading unit 104 has a front cover 115 that is openable and closable to detach and attach an ink cartridge 200.

A reference numeral 111 represents an upper cover and a reference numeral 112 represents the front surface of the front cover.

Figure 3:
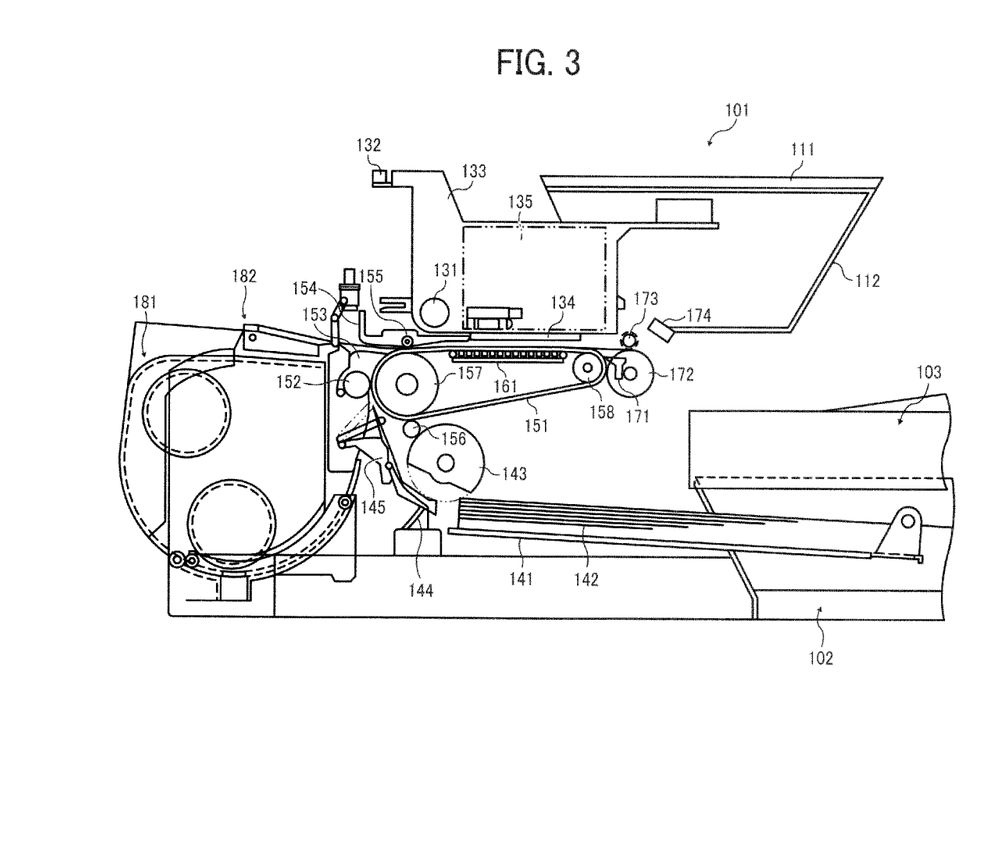
FIG. 3 is a diagram illustrating the internal structure of the inkjet recording device 101.

Inside the inkjet recording device 101, as illustrated in FIG. 3, a guide rod 131 serving as a guiding member that laterally bridges side plates provided on the right side and left side of the inkjet recording device 101 and a stay 132 hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having a stimulus-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for each color to supply each color ink to the recording head 134. The ink is supplied and replenished to the sub-tanks 135 from the ink cartridge 200 mounted onto the ink cartridge loading unit 104 via an ink supplying tube.

A sheet feeding unit to feed a substrate (recording medium, sheet) 142 loaded on a substrate loader (pressure plate) 141 of the sheet feeder tray 102 includes a half-moon shape roller (sheet feeding roller 143) to separate and feed the substrate 142 one by one from the substrate loader 141 and a separation pad 144 that is made of a material having a large friction index and arranged facing the sheet feeding roller 143 while being biased towards the sheet feeding roller 143.

A transfer unit to transfer the substrate 142 fed from the sheet feeding unit on the lower side of the recording head 134 has a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 to make the substrate 142 trace on the transfer belt 151 by changing the transfer direction of the substrate 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 has an endless form, stretched between a transfer roller 157 and a tension roller 158 and is rotatable in the belt transfer direction.

This transfer belt 151 has, for example, a top layer serving as a sheet adsorption surface made of a resin material such as a copolymer (ETFE) of tetrafluoroethylene and ethylene with no resistance treatment having a thickness about 40 μm, and a bottom layer (intermediate resistance layer, earth layer) made of the same material as that for the top layer with resistance treatment with carbon.

On the rear side of the transfer belt 151, a guiding member 161 is arranged corresponding to the printing area by the recording head 134.

A discharging unit to discharge the substrate 142 on which images are recorded by the recording head 134 includes a separation claw 171 to separate the substrate 142 from the transfer belt 151, a discharging roller 172, and a discharging roller 173.

The substrate 142 is dried by heat wind by a fun heater 174 and thereafter output to a discharging tray 103 arranged below the discharging roller 172.

A duplex printing sheet feeding unit 181 is detachably attached to the rear side of the inkjet recording device 101.

The duplex printing sheet feeding unit 181 takes in and reverses the substrate 142 that is returned by the reverse rotation of the transfer belt 151 and feeds it again between the counter roller 152 and the transfer belt 151.

A manual sheet feeding unit 182 is provided on the upper surface of the duplex printing sheet feeding unit 181

In this inkjet recording device, the substrate 142 is separated and fed from the sheet feeding unit one by one substantially vertically upward, guided by the guide 145, and transferred while being pinched between the transfer belt 151 and the counter roller 152.

Furthermore, the front end is guided by the transfer guide 153 and pressed against the transfer belt 151 by the front end pressure roller 155 to change the transfer direction substantially 90°.

Since the transfer belt 151 is charged by the charging roller 156 at this point in time, the substrate 142 is electrostatically adsorbed to the transfer belt 151 and transferred.

By driving the recording head 134 according to the image signal while moving the carriage 133, ink droplets are discharged to the substrate 142 not in motion to record an image for an amount corresponding to one line and thereafter the substrate 142 is transferred in a predetermined amount to conduct recording for the next line.

On receiving a signal indicating that the recording has completed or the rear end of the substrate 142 has reached the image recording area, the recording operation stops and the substrate 142 is discharged to the discharging tray 103.

The substrate on which images are printed by the inkjet recording device of the present disclosure is preferably a non-porous substrate.

The non-porous substrate is, for example, laminate paper, coated paper, or a resin film having a surface formed of a plastic material such as transparent or colored vinyl chloride film, polyethylene terephthalate (PET), acrylic film, polypropylene film, polyimide film, and polystyrene film, without containing paper components such as wood pulp paper, Japanese paper, synthesized pulp paper, and synthesized fiber paper in the surface.

The inkjet recording device of the present disclosure can be applied to recording systems employing inkjet recording system such as printers, facsimile machines, photocopiers, multi-functional machines (printer/facsimile/photocopier) for inkjet recording in particular.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto. "%." in Examples represent "% by weight".

Example 1

Preparation of Pigment Liquid Dispersion 1

After preliminarily mixing the following recipe, a pigment liquid dispersion 1 was obtained by conducting circulation dispersion for seven hours by a disc-type bead mill (KDL type, manufactured by SHINMARU ENTERPRISES CORPORATION; Media: zirconia ball having a diameter of 0.3 mm).

| | |
|---|---|
| Carbon black pigment (Mitsubishi Carbon Black #2300, manufactured by Mitsubishi Chemical Corporation): | 15% |
| Anionic surfactant (Pionine A-51-B, manufactured by TAKEMOTO OIL & FAT Co., Ltd.): | 2% |
| Water: | 83% |

The following recipe containing the pigment liquid dispersion 1 was mixed and stirred and thereafter filtrated by a polypropylene filter of 0.2 pan to prepare ink.

| | |
|---|---|
| Pigment liquid dispersion 1: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 20% |
| 1,3-propane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Example 2

Preparation of Pigment Liquid Dispersion 2

A pigment liquid dispersion 2 was manufactured in the same manner as in the preparation of the pigment liquid dispersion 1 except that the pigment was changed to pigment blue 15:3 (Cyanine blue A-38, manufactured by Dainichiseika Color & Chemicals Mfg. Co. Ltd.)

Ink was manufactured in the same manner as in Example 1 except that the ink recipe was changed to the following using the pigment liquid dispersion 2:

| | |
|---|---|
| Pigment liquid dispersion 2: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2S,3S)-(+)-2,3-butane diol: | 20% |
| 1,3-propane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Example 3

Preparation of Pigment Liquid Dispersion 3

Pigment liquid dispersion 3 was manufactured in the same manner as in preparation of pigment liquid dispersion 1 except that the pigment was changed to Pigment Red 122 (CROMOPHTAL™ JET Magenta DMQ, manufactured by Ciba Japan K.K.

Ink was manufactured in the same manner as in Example 1 except that the ink recipe was changed to the following using the pigment liquid dispersion 3:

| | |
|---|---|
| Pigment liquid dispersion 3: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 15% |
| Meso-2,3-butane diol: | 5% |
| 1,2-butane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Example 4

Preparation of Pigment Liquid Dispersion 4

A pigment liquid dispersion 4 was manufactured in the same manner as in the preparation of the pigment liquid dispersion 1 except that the pigment was changed to pigment yellow 74 (Yellow No. 43, manufactured by Dainichiseika Color & Chemicals Mfg. Co. Ltd.).

Ink was manufactured in the same manner as in Example 1 except that the ink recipe was changed to the following using the pigment liquid dispersion 4:

| | |
|---|---|
| Pigment liquid dispersion 4: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 5% |
| (2S,3S)-(+)-2,3-butane diol: | 5% |
| Meso-2,3-butane diol: | 8% |
| 1,3-butane diol: | 10% |
| Diethylene glycol-n-butyl ether: | 10% |
| Water: | 15.9% |
| Preservatives and fungicides (PROXEL LV, manufactured by AVECIA GROUP): | 0.1% |

Example 5

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 30% |
| Diethylene glycol-n-butyl ether: | 10% |
| Water: | 13.9% |
| Preservatives and fungicides (PROXEL LV, manufactured by AVECIA GROUP): | 0.1% |

Example 6

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 5% |
| Diethylene glycol-n-butyl ether: | 10% |
| Water: | 38.9% |
| Preservatives and fungicides (PROXEL LV, manufactured by AVECIA GROUP): | 0.1% |

Example 7

Using the same liquid dispersion of pigment as used in Example 1, the following recipe was mixed and stirred and thereafter filtrated by a polypropylene filter of 0.2 μm to prepare ink.

| | |
|---|---|
| Pigment liquid dispersion 1: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 10% |
| Diethylene glycol-n-butyl ether: | 10% |
| Water: | 33.9% |
| Preservatives and fungicides (PROXEL LV, manufactured by AVECIA GROUP): | 0.1% |

Example 8

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 20% |
| Diethylene glycol-n-butyl ether: | 10% |
| Water: | 23.9% |
| Preservatives and fungicides (PROXEL LV, manufactured by AVECIA GROUP): | 0.1% |

Example 9

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 40% |
| Diethylene glycol-n-butyl ether: | 10% |
| Water: | 3.9% |
| Preservatives and fungicides (PROXEL LV, manufactured by AVECIA GROUP): | 0.1% |

Example 10

Ink was manufactured in the same manner as in Example 1 except that the ink recipe was changed to the following:

| | |
|---|---|
| Pigment liquid dispersion 2: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2S,3S)-(+)-2,3-butane diol: | 20% |
| 3-methyl-1,3-butane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Example 11

Ink was manufactured in the same manner as in Example 1 except that the ink recipe was changed to the following:

| | |
|---|---|
| Pigment liquid dispersion 3: | 24% |
| Aqueous polyurethane resin emulsion (HYDRAN HW-340, solid portion: 25%, solvent: water, volume average particle diameter: 35 nm, manufactured by DIC Corporation): | 21.6% |
| Surfactant $CH_3(CH_2)_{12}O(CH_2CH_2O)_3CH_2COOH$: | 2% |
| (2R,3R)-(−)-2,3-butane diol: | 15% |
| Meso-2,3-butane diol: | 5% |
| 1,2-butanediol: | 10% |
| Diethylene glycol-n-butyl ether: | 10% |
| Water: | 12.3% |
| Preservatives and fungicides (PROXEL LV, manufactured by AVECIA GROUP): | 0.1% |

Example 12

Ink was manufactured in the same manner as in Example 1 except that the ink recipe was changed to the following:

| | |
|---|---|
| Pigment liquid dispersion 4: | 36% |
| Aqueous polyurethane resin emulsion (solid portion: 25%, solvent: water): (HYDRAN HW-340, volume average particle diameter: 35 nm, manufactured by DIC Corporation) | 14.4% |
| Surfactant $CH_3(CH_2)_{12}O(CH_2CH_2O)_3CH_2COOH$: | 2% |
| (2R,3R)-(−)-2,3-butane diol: | 5% |
| (2S,3S)-(+)-2,3-butane diol: | 5% |
| Meso-2,3-butane diol: | 8% |
| 1,3-butane diol: | 10% |
| Diethylene glycol-n-butyl ether: | 10% |
| Water: | 9.5% |
| Preservatives and fungicides (PROXEL LV, manufactured by AVECIA GROUP): | 0.1% |

Example 13

Ink was manufactured in the same manner as in Example 1 except that the ink recipe was changed to the following:

| | |
|---|---|
| Pigment liquid dispersion 1: | 40% |
| Aqueous polyurethane resin emulsion (solid portion: 25%, solvent: water): (HYDRAN HW-340, volume average particle diameter: 35 nm, manufactured by DIC Corporation) | 12% |
| Surfactant $CH_3(CH_2)_{12}O(CH_2CH_2O)_3CH_2COOH$: | 2% |
| (2R,3R)-(−)-2,3-butane diol: | 20% |
| 1,3-propane diol: | 10% |

-continued

| | |
|---|---|
| Diethylene glycol-n-butyl ether: | 10% |
| Water: | 5.9% |
| Preservatives and fungicides (PROXEL LV, manufactured by AVECIA GROUP): | 0.1% |

Example 14

Ink was manufactured in the same manner as in Example 1 except that the ink recipe was changed to the following:

| | |
|---|---|
| Pigment liquid dispersion 1: | 20% |
| Aqueous styrene acrylic resin emulsion (VONCOAT CG-8370, volume average particle diameter: 100 nm, manufactured by DIC Corporation) (solid portion: 50%): (VONCOAT CG-8370, volume average particle diameter: 100 nm, manufactured by DIC Corporation) | 12% |
| Surfactant $CH_3(CH_2)_{12}O(CH_2CH_2O)_3CH_2COOH$: | 2% |
| (2R,3R)-(−)-2,3-butane diol: | 20% |
| 1,3-propane diol: | 10% |
| Diethylene glycol-n-butyl ether: | 10% |
| Water: | 25.9% |
| Preservatives and fungicides (PROXEL LV, manufactured by AVECIA GROUP): | 0.1% |

Example 15

Ink was manufactured in the same manner as in Example 1 except that the ink recipe was changed to the following:

| | |
|---|---|
| Pigment liquid dispersion 2: | 20% |
| Aqueous styrene acrylic resin emulsion (HYDRAN AP-30F, solid portion: 25%, solvent: water, volume average particle diameter: 60 nm, manufactured by DIC Corporation): | 24% |
| Surfactant $CH_3(CH_2)_{12}O(CH_2CH_2O)_3CH_2COOH$: | 2% |
| (2S,3S)-(+)-2,3-butane diol: | 20% |
| 1,3-propane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Example 16

Ink was manufactured in the same manner as in Example 1 except that the ink recipe was changed to the following:

| | |
|---|---|
| Pigment liquid dispersion 3: | 20% |
| Aqueous poryurethane resin emulsion (SUPERFLEX ® 470, volume average particle diameter: 50 nm, manufactured by DAI-ICHI KOGYO SEIYAKU CO., LTD.) (solid portion: 38%, solvent: water): | 15.8% |
| Surfactant $CH_3(CH_2)_{12}O(CH_2CH_2O)_3CH_2COOH$: | 2% |
| (2R,3R)-(−)-2,3-butane diol: | 15% |
| Meso-2,3-butane diol: | 5% |
| 1,2-butane diol: | 10% |
| Diethylene glycol-n-butyl ether: | 10% |
| Water: | 22.1% |
| Preservatives and fungicides (PROXEL LV, manufactured by AVECIA GROUP): | 0.1% |

Example 17

Ink was manufactured in the same manner as in Example 1 except that the ink recipe was changed to the following:

| | |
|---|---|
| Pigment liquid dispersion 3: | 20% |
| Aqueous polyurethane resin emulsion (SUPERFLEX ® 126, volume average particle diameter: 20 nm, manufactured by DAI-ICHI KOGYO SEIYAKU CO., LTD.) (solid portion: 30%, solvent: water): | 20% |
| Surfactant $CH_3(CH_2)_{12}O(CH_2CH_2O)_3CH_2COOH$: | 2% |
| (2R,3R)-(−)-2,3-butane diol: | 15% |
| Meso-2,3-butane diol: | 5% |
| 1,2-butane diol: | 10% |
| Diethylene glycol-n-butyl ether: | 10% |
| Water: | 17.9% |
| Preservatives and fungicides (PROXEL LV, manufactured by AVECIA GROUP): | 0.1% |

Example 18

Ink was manufactured in the same manner as in Example 1 except that the ink recipe was changed to the following:

| | |
|---|---|
| Pigment liquid dispersion 3: | 20% |
| Aqueous polyurethane resin emulsion (SUPERFLEX ® 830 HS, volume average particle diameter: 10 nm, manufactured by DAI-ICHI KOGYO SEIYAKU CO., LTD.) (solid portion: 27%, solvent: water,): | 22.2% |
| Surfactant $CH_3(CH_2)_{12}O(CH_2CH_2O)_3CH_2COOH$: | 2% |
| (2R,3R)-(−)-2,3-butane diol: | 15% |
| Meso-2,3-butane diol: | 5% |
| 1,2-butane diol: | 10% |
| Diethylene glycol-n-butyl ether: | 10% |
| Water: | 15.7% |
| Preservatives and fungicides (PROXEL LV, manufactured by AVECIA GROUP): | 0.1% |

Comparative Example 1

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, volume average particle diameter: 35 nm, manufactured by DIC Corporation) (solid portion: 25%, solvent: water): | 24% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Comparative Example 2

Ink was manufactured in the same manner as in Example 1 except that the ink recipe was changed to the following:

| | |
|---|---|
| Pigment liquid dispersion 2: | 20% |
| Aqueous polyurethane resin emulsion (HYDRAN HW-340, volume average particle diameter: 35 nm, manufactured by DIC Corporation) (solid portion: 25%, solvent: water): | 24% |
| Surfactant $CH_3(CH_2)_{12}O(CH_2CH_2O)_3CH_2COOH$: | 2% |
| (2S,3S)-(+)-2,3-butane diol: | 10% |
| Meso-2,3-butane diol: | 20% |
| 1,3-propane diol: | 10% |
| Diethylene glycol-n-butyl ether: | 10% |
| Water: | 13.9% |
| Preservatives and fungicides (PROXEL LV, manufactured by AVECIA GROUP): | 0.1% |

Comparative Example 3

Ink was manufactured in the same manner as in Example 1 except that the ink recipe was changed to the following:

| | |
|---|---|
| Pigment liquid dispersion 3: | 20% |
| Aqueous polyurethane resin emulsion (HYDRAN HW-340, volume average particle diameter: 35 nm, manufactured by DIC Corporation) (solid portion: 25%, solvent: water): | 24% |
| Surfactant $CH_3(CH_2)_{12}O(CH_2CH_2O)_3CH_2COOH$: | 2% |
| 1,2-butane diol: | 30% |
| Diethylene glycol-n-butyl ether: | 10% |
| Water: | 13.9% |
| Preservatives and fungicides (PROXEL LV, manufactured by AVECIA GROUP): | 0.1% |

Comparative Example 4

Ink was manufactured in the same manner as in Example 1 except that the ink recipe was changed to the following:

| | |
|---|---|
| Pigment liquid dispersion 4: | 20% |
| Surfactant $CH_3(CH_2)_{12}O(CH_2CH_2O)_3CH_2COOH$: | 2% |
| (2R,3R)-(−)-2,3-butane diol: | 6% |
| (2S,3S)-(+)-2,3-butane diol: | 6% |
| Meso-2,3-butane diol: | 8% |
| 1,3-butane diol: | 10% |
| Diethylene glycol-n-butyl ether: | 10% |
| Water: | 37.9% |
| Preservatives and fungicides (PROXEL LV, manufactured by AVECIA GROUP): | 0.1% |

Comparative Example 5

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, volume average particle diameter: 35 nm, manufactured by DIC Corporation) (solid portion: 25%, solvent: water): | 24% |
| Surfactant $CH_3(CH_2)_{12}O(CH_2CH_2O)_3CH_2COOH$: | 2% |
| (2S,3S)-(+)-2,3-butane diol: | 2% |
| 1,3-propane diol: | 10% |
| Diethylene glycol-n-butyl ether: | 10% |
| Water: | 31.9% |
| Preservatives and fungicides (PROXEL LV, manufactured by AVECIA GROUP): | 0.1% |

Comparative Example 6

Ink was manufactured in the same manner as in Example 1 except that the ink recipe was changed to the following:

| | |
|---|---|
| Pigment liquid dispersion 1: | 20% |
| Aqueous polyurethane resin emulsion (HYDRAN HW-340, volume average particle diameter: 35 nm, manufactured by DIC Corporation) (solid portion: 25%, solvent: water): | 24% |
| Surfactant $CH_3(CH_2)_{12}O(CH_2CH_2O)_3CH_2COOH$: | 2% |
| (2S,3S)-(+)-2,3-butane diol: | 45% |
| Diethylene glycol-n-butyl ether: | 8.9% |
| Preservatives and fungicides (PROXEL LV, manufactured by AVECIA GROUP): | 0.1% |

Inks of Examples 1 to 18 and Comparative Examples 1 to 6 were subjected to the following evaluation.

The results are shown in Table 1.

Evaluation of Storage Stability

An ink cartridge was filed with each ink and stored at 65° C. for three weeks to evaluate the state of viscosity increasing and agglomeration by the viscosity change rate between before and after storage. When the viscosity change rate is 10% or less, no practical problem is caused.

Viscosity was measured at 25° C. by using a viscometer TVB-25 type (manufactured by TOKI SANGYO CO., LTD.).

Evaluation of Discharging Stability

An inkjet printer (remodeled based on IPSIO GXe5500, manufactured by Ricoh Co., Ltd.) having a cover was filled with each ink and left at 10° C. and 15% RH for one week with the cover closed. Thereafter, a nozzle checker pattern was printed to check the number of malfunctioning nozzles.

When the number of malfunctioning nozzles is 7 or less, no practical problem is caused.

Evaluation on Drying Property

An inkjet printer (remodeled based on IPSiO GXe 5500, manufactured by RICOH Co., Ltd.) having a fan to conduct heating after printing was filled with the manufactured ink. A solid image was printed on a non-porous substrate (white vinyl chloride sheet IJ5331, manufactured by Sumitomo 3M Limited.) followed by drying at 60° C. by a heating fan to form an image. Thereafter, filter paper was pressed against the solid portion. The drying property of the ink was evaluated based on the state of transfer of the ink to the filter paper according to the following criteria:

Evaluation Criteria

A: No transfer of ink to filter paper on drying condition of 60° C. for 15 minutes B: No transfer of ink to filter paper on drying condition of 60° C. for 30 minutes C: No transfer of ink to filter paper on drying condition of 60° C. for 60 minutes D: Transfer of ink to filter paper continuing after drying at 60° C. for 60 minutes Evaluation on Scratch Resistance The solid portion of an image formed in the same manner as in Evaluation on drying property was abraded by dry cotton (unbleached muslin No. 3) with a load of 400 g and the number of scratching at which the density of the solid portion is reduced by visual confirmation. The higher the number of scratching, the more robust the image.

Evaluation on Ethanol Resistance

The solid image portion of an image formed in the same manner as in Evaluation on drying property was abraded by a cotton applicator impregnated in 50% aqueous solution of ethanol. Ethanol resistance was determined by the number of abrasion at which peeling of the layer of the solid portion occurred. The higher the number of abrasion, the higher the ethanol resistance.

Example 19

An image was formed in the same manner as in evaluation on drying property except that the drying temperature by the heating fan was changed to 30° C. using the ink of Example 1.

Example 20

An image was formed in the same manner as in evaluation on drying property except that the drying temperature by the heating fan was changed to 90° C. using the ink of Example 1.

Example 21

An image was formed in the same manner as in evaluation on drying property except that the heating fan was off while using the ink of Example 3.

Example 22

An image was formed in the same manner as in evaluation on drying property except that the heating fan was off while using the ink of Example 4.

Example 23

An image was formed in the same manner as in evaluation on drying property except that the non-porous substrate (white vinyl chloride sheet IJ5331, manufactured by Sumitomo 3M Limited.) was changed to TYPE 6200 (manufactured by Ricoh Co., Ltd.) and the drying temperature by the heating fan was changed to 30° C. using the ink of Example 1.

Each image formed in Examples 19 to 23 was evaluated in the same manner as in Examples 1 to 18 with regard to drying property, scratch resistance, and ethanol resistance.

The results are shown in Table 1.

On the other hand, when the ratio of meso form is 50% by weight or more as seen in Comparative Examples 1 and 2, no 2,3-butane diol was contained as seen in Comparative Example 3, no resin was contained as seen in Comparative Example 4, or the ratio of 2,3-butane diol is outside the range of from 5% by weight to 40% by weight as seen in Comparative Examples 5 and 6, the results are not good.

According to the present invention, an aqueous ink for inkjet is provided which has excellent storage property and discharging stability over time and satisfies drying properties and image robustness at printed portions even when an image is printed on a non-porous substrate, into which aqueous ink is not or little permeable.

Having now fully described embodiments of the present invention, it will be apparent to one of ordinary skill in the art that many changes and modifications can be made thereto without departing from the spirit and scope of embodiments of the invention as set forth herein.

What is claimed is:

1. Aqueous ink for inkjet comprising:
   water;
   a hydrosoluble organic solvent;
   a pigment; and
   a resin,

TABLE 1

|  | Evaluation on storage stability | Evaluation on discharging stability | Evaluation on drying property | Evaluation on scratch resistance (# of times) | Evaluation on ethanol resistance | Memo |
|---|---|---|---|---|---|---|
| Example 1 | 1.3% | 0 | A | 145 | 77 |  |
| Example 2 | 1.1% | 0 | A | 140 | 73 |  |
| Example 3 | 0.5% | 0 | A | 132 | 70 |  |
| Example 4 | 0.9% | 0 | B | 117 | 66 |  |
| Example 5 | 1.4% | 2 | A | 144 | 79 |  |
| Example 6 | 0.3% | 4 | C | 105 | 57 |  |
| Example 7 | 0.6% | 3 | B | 118 | 68 |  |
| Example 8 | 1.0% | 2 | A | 130 | 76 |  |
| Example 9 | 1.7% | 2 | A | 108 | 55 |  |
| Example 10 | 5.6% | 5 | A | 91 | 53 |  |
| Example 11 | 2.3% | 0 | A | 139 | 75 |  |
| Example 12 | 3.4% | 0 | B | 84 | 51 |  |
| Example 13 | 3.0% | 0 | A | 87 | 53 |  |
| Example 14 | 7.3% | 6 | A | 82 | 54 |  |
| Example 15 | 6.2% | 4 | A | 108 | 63 |  |
| Example 16 | 4.8% | 0 | A | 132 | 70 |  |
| Example 17 | 4.1% | 0 | A | 124 | 68 |  |
| Example 18 | 8.5% | 6 | A | 94 | 56 |  |
| Example 19 | — | — | B | 86 | 55 |  |
| Example 20 | — | — | A | 150 | 81 | White vinyl chloride slightly deformed by heat |
| Example 21 | — | — | C | 80 | 50 |  |
| Example 22 | — | — | C | 83 | 55 |  |
| Example 23 | — | — | C | 81 | 52 |  |
| Comparative Example 1 | 7.4% | 11 | C | 75 | 31 |  |
| Comparative Example 2 | 7.0% | 9 | B | 78 | 35 |  |
| Comparative Example 3 | 8.4% | 15 | D | 66 | 28 |  |
| Comparative Example 4 | 2.1% | 1 | B | 13 | 3 |  |
| Comparative Example 5 | 0.3% | 23 | D | 34 | 11 |  |
| Comparative Example 6 | 9.7% | 3 | A | 39 | 18 |  |

As seen in the results of Table 1 the ink of the present disclosure has excellent storage stability, discharging stability, and image robustness. Also, the heating temperature after printing is found to be preferably from 40° C. to 80° C.

wherein the hydrosoluble organic solvent comprises 2,3-butane diol,
wherein the 2,3-butane diol comprises a (2R, 3R) form of 2,3-butane diol and a (2S, 3S) form of 2,3-butane diol, where the (2R, 3R) form of 2,3-butane diol represents (2R,3R)-(−)-2,3-butane diol and the (2S, 3S) form of 2,3-butane diol represents (2S,3S)-(+)-2,3-butane diol, wherein the (2R, 3R) form and the (2S, 3S) form of 2,3-butane diol are included in an amount of 50% by weight or more based on the total amount of the 2,3-butane diol, and wherein the 2,3-butane diol accounts for 5% by weight to 40% by weight of the aqueous ink.

2. The aqueous ink for inkjet according to claim 1, wherein the hydrosoluble organic solvent further comprises at least one of 1,3-propane diol, 1,2-butane diol, or 1,3-butane diol.

3. The aqueous ink for inkjet according to claim 1, wherein the resin has a volume average particle diameter of from 20 nm to 50 nm.

4. An ink cartridge comprising:
an ink container to accommodate the aqueous ink for inkjet of claim 1.

5. An inkjet recording device comprising:
the ink cartridge of claim 4;
an ink discharging device to apply a stimulus to ink to discharge the ink for printing;
a transfer device to transfer a recording medium; and
a heater to fix droplets of ink on the recording medium.

6. The inkjet recording device according to claim 5, wherein a heating temperature of the heater is set to be from 40° C. to 80° C.

\* \* \* \* \*